(12) United States Patent
McDowell

(10) Patent No.: US 9,212,746 B2
(45) Date of Patent: Dec. 15, 2015

(54) APPARATUS AND METHODS FOR SEALING BETWEEN ADJACENT COMPONENTS OF A LOAD-SUPPORTING SURFACE

(71) Applicant: NEWPARK MATS & INTEGRATED SERVICES LLC, The Woodlands, TX (US)

(72) Inventor: James Kerwin McDowell, Lafayette, LA (US)

(73) Assignee: Newpark Mats & Integrated Services LLC, The Woodlands, TX (US)

( * ) Notice: Subject to any disclaimer, the term of this patent is extended or adjusted under 35 U.S.C. 154(b) by 66 days.

(21) Appl. No.: 13/803,580

(22) Filed: Mar. 14, 2013

(65) Prior Publication Data

US 2013/0264773 A1    Oct. 10, 2013

Related U.S. Application Data

(60) Provisional application No. 61/621,898, filed on Apr. 9, 2012.

(51) Int. Cl.
| | |
|---|---|
| *F16J 15/10* | (2006.01) |
| *F16J 15/02* | (2006.01) |
| *E01C 5/00* | (2006.01) |
| *E01C 5/20* | (2006.01) |
| *E01C 9/08* | (2006.01) |

(52) U.S. Cl.
CPC ................. *F16J 15/10* (2013.01); *E01C 5/003* (2013.01); *E01C 5/005* (2013.01); *F16J 15/021* (2013.01); *E01C 5/20* (2013.01); *E01C 9/086* (2013.01); *E01C 2201/12* (2013.01)

(58) Field of Classification Search
CPC ........ F16J 15/027; F16J 15/025; E01C 9/086; E01C 5/003; E01C 5/005
See application file for complete search history.

(56) References Cited

U.S. PATENT DOCUMENTS

| | | | | |
|---|---|---|---|---|
| 3,411,260 A | * | 11/1968 | Dill | 52/396.03 |
| 3,521,528 A | * | 7/1970 | Wangerow | 404/69 |
| 3,732,788 A | * | 5/1973 | Brown | 404/64 |
| 4,362,427 A | * | 12/1982 | Mass et al. | 404/64 |
| 4,522,413 A | * | 6/1985 | Nicholas | 277/645 |
| 4,708,517 A | * | 11/1987 | Nicholas et al. | 404/64 |
| 4,743,036 A | * | 5/1988 | Nicholas | 277/645 |
| 5,653,551 A | | 8/1997 | Seaux | |

(Continued)

FOREIGN PATENT DOCUMENTS

| | | |
|---|---|---|
| DE | 1251933 | 10/1967 |
| DE | 8531020 U1 | 2/1986 |

(Continued)

OTHER PUBLICATIONS

"DURA-BASE Composite Mat System", Newpark Mats & Integrated Services, 8 pp.

*Primary Examiner* — Gilbert Lee
(74) *Attorney, Agent, or Firm* — E. Randall Smith; Jones & Smith, LLP

(57) ABSTRACT

Apparatus for sealing the gap between adjacent interconnecting mats in a reusable load-supporting surface deployed on the ground includes a seal member. The seal member includes an elongated main body and an elongated planar tail extending outwardly therefrom. The main body is positionable in the gap and the tail is configured to extend into at least a portion of the interface formed between upper and lower lips of the adjacent mats.

15 Claims, 6 Drawing Sheets

(56) References Cited

U.S. PATENT DOCUMENTS

| | | |
|---|---|---|
| 5,900,203 A | 5/1999 | Needham et al. |
| 6,511,257 B1 | 1/2003 | Seaux et al. |
| 6,649,110 B1 | 11/2003 | Seaux et al. |
| 6,695,527 B2 | 2/2004 | Seaux et al. |
| 6,722,831 B2 | 4/2004 | Rogers et al. |
| 7,413,374 B2 | 8/2008 | Rogers et al. |
| 2008/0245014 A1 | 10/2008 | Carter |

FOREIGN PATENT DOCUMENTS

| | | |
|---|---|---|
| EP | 1762670 A1 | 12/2005 |
| WO | 2005/040523 A1 | 5/2005 |

\* cited by examiner

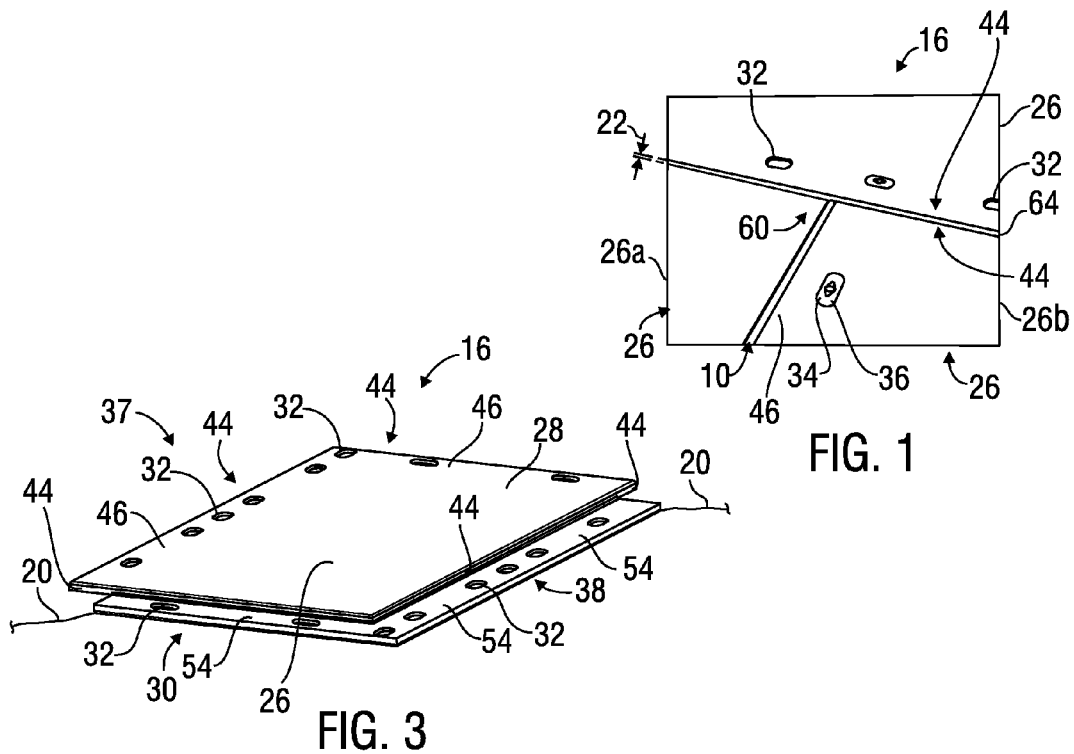
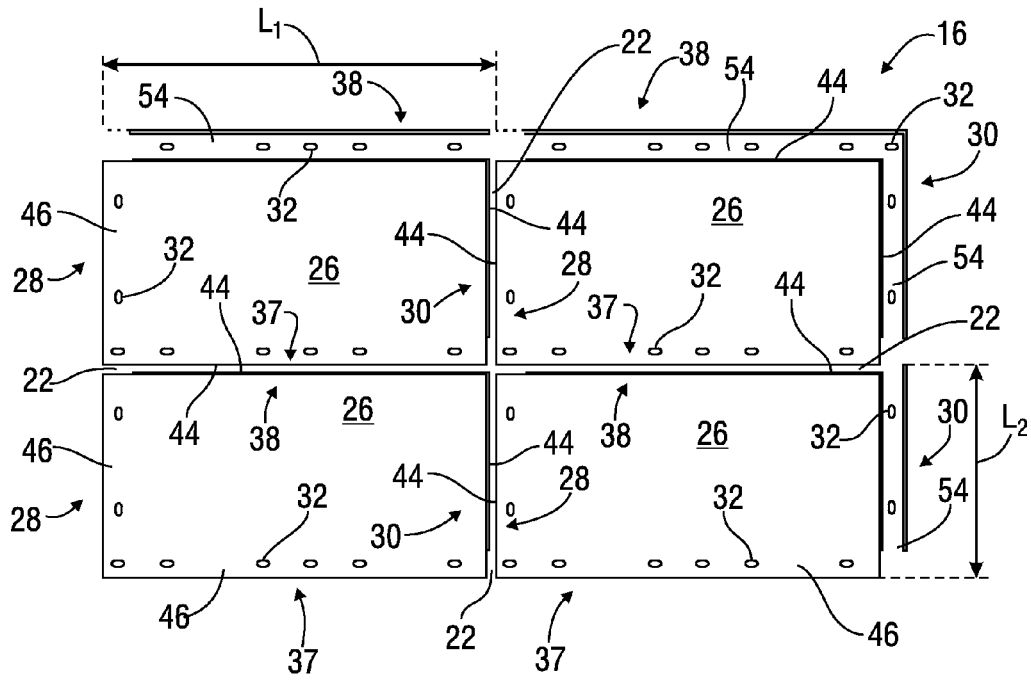

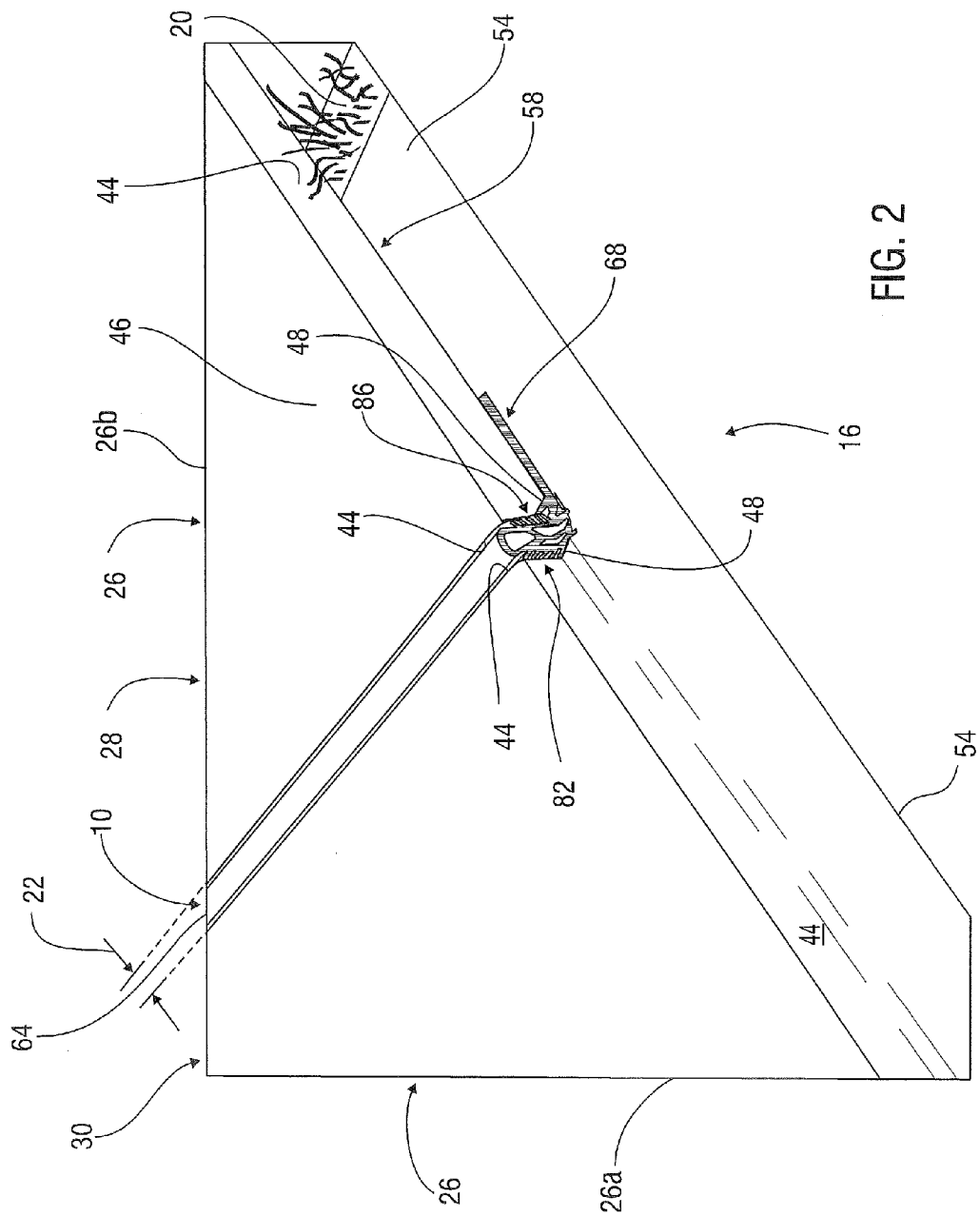

APPARATUS AND METHODS FOR SEALING BETWEEN ADJACENT COMPONENTS OF A LOAD-SUPPORTING SURFACE

The present application claims priority to U.S. Provisional Patent Application Ser. No. 61/621,898, filed on Apr. 9, 2012 and entitled "Method of Producing Impermeable Temporary Load Bearing Surfaces", which is hereby incorporated herein by reference in its entirety.

FIELD OF THE DISCLOSURE

The present disclosure relates generally to preventing the leakage of liquid from a load-supporting surface and, more particularly, to forming a seal between adjacent components of a load-supporting surface.

BACKGROUND

Temporary or semi-permanent support surfaces have been used for roadways, remote jobsites, industrial staging areas and the like in an ever-increasing myriad of industries, such as the construction, military, oilfield, transportation, disaster response, utilities and entertainment industries. These support surfaces are often made up of heavy duty, durable, all-weather thermoplastic mats, which are reusable and interlock together to form the support surface. Traditionally, a plastic liner is placed below and around the mat assembly in an effort to capture liquids that are spilled or otherwise introduced onto the support surface before such liquids encounter the subgrade terrain.

The use of liners with temporary or semi-permanent support surfaces may have one or more disadvantages. In many instances, once the need for the temporary support surface has lapsed, the interlocking mats are disassembled for later use. However, since the liners, unlike the mats, are not normally reusable, they must often be discarded. This can be problematic because landfill operators have expressed disinterest in accepting used liners on the basis that they are bulky and require excessive landfill space, or for other reasons. Thus, it can be difficult to find suitable, cost-effective ways to dispose of the liners. For another example, the plastic liners are sometimes ineffective at preventing liquid leakage from the support surface or allowing effective clean-up, which can cause other problems and require significant time and effort. Thus, there is a need for improved apparatus, systems and methods for preventing liquids spilled or otherwise introduced onto a load-supporting surface from leaking between adjacent mats or other components.

It should be understood that the above-described features, capabilities and disadvantages are provided for illustrative purposes only and are not intended to limit the scope or subject matter of the appended claims or those of any related patent application or patent. Thus, none of the appended claims or claims of any related application or patent should be limited by the above discussion or construed to address, include or exclude each or any of the above-cited features, capabilities or disadvantages merely because of the mention thereof herein.

Accordingly, there exists a need for improved systems, articles and methods useful in connection with containing liquids introduced onto a load-supporting surface having one or more of the attributes or capabilities described or shown in, or as may be apparent from, the other portions of this patent.

BRIEF SUMMARY OF THE DISCLOSURE

In some embodiments, the present disclosure involves apparatus for sealing the gap between adjacent mats in a reusable load-supporting surface deployed on the ground. The load-supporting surface is capable of supporting the weight of vehicles and equipment thereupon and includes at least two mats. Each mat is planar and has at least four sides and an edge extending along each side. The first and second sides of each mat have a lower lip extending horizontally outwardly below the edge thereof. The third and fourth sides of each mat have an upper lip forming the edge thereof. The respective upper and lower lips of different mats are interconnectable with locking pins releasably securable through corresponding locking pin holes formed therein. The gap is formed between adjacent edges of adjacent interconnected mats in the load-supporting surface. The gap has a width, depth and length and is in fluid communication with a horizontally-extending interface formed between the adjacent upper and lower lips of adjacent mats. The interface is in fluid communication with the ground beneath the load-supporting surface.

The apparatus of these embodiments includes an elongated seal member constructed of rubber that includes an elongated main body and an elongated planar tail. The main body is configured to be disposed within the gap. The main body has a width that is greater than the width of the gap, and first and second side walls configured to sealingly engage the adjacent edges of the adjacent mats that form the gap to prevent the ingress of fluid from the gap into the interface. The main body has a height that is smaller than the height of the gap to assist in preventing damage to the seal member when vehicles or equipment move across the load-supporting surface. The tail extends horizontally outwardly from the main body along the second side thereof and is configured to extend into at least a portion of the interface when the main body is disposed within the gap. Fluid introduced onto the load-supporting surface is thus prevented from flowing from the gap into the interface formed between adjacent mats.

In various embodiments, the present disclosure involves methods of sealing the gap between adjacent mats in a reusable load-supporting surface deployed on the ground. The load-supporting surface is capable of supporting the weight of vehicles and equipment thereupon and includes at least two mats. Each mat is planar and has at least four sides and an edge extending along each side. The first and second sides of each mat have a lower lip extending horizontally outwardly below the edge thereof. The third and fourth sides of each mat have an upper lip forming the edge thereof. The respective upper and lower lips of different mats are interconnectable with locking pins releasably securable through corresponding locking pin holes formed therein. When at least two mats are used to form the load-supporting surface, the gap is formed between adjacent edges of adjacent mats. The gap has a width, depth and length and is in fluid communication with a horizontally-extending interface formed between the adjacent upper and lower lips of the adjacent mats. The interface is in fluid communication with the ground beneath the load-supporting surface.

The method of these embodiments includes placing a first mat on the ground. An elongated seal member is placed along the edge of the first side of the first mat, so that a first side wall of the main body of the seal member abuts that edge of the first mat, and an elongated tail of the seal member extends across a portion of the lower lip of the first mat along its first side. The third side of the second mat is positioned adjacent to the first side of the first mat, so that the edge of the third side of the second mat abuts a second side wall of the main body of the seal member, and the upper lip of the third side of the second mat overlays the lower lip of the first mat and the tail of the seal member. Thus, the main body of the seal member is sandwiched between the respective aligned edges of the adjacent mats, and the tail of the seal member is sandwiched between the respective aligned upper and lower lips of the adjacent mats. At least one locking pin hole of the upper lip of the second mat is aligned over a locking pin hole of the lower lip of the first mat. A locking pin is secured in the aligned pair(s) of respective locking pin holes of the first and second mats to compress the main body of the seal member between the first and second mats and into sealing engagement with the respective adjacent edges thereof. Fluid introduced onto the load-supporting surface is thus prevented from entering the interface formed between the first and second mats.

The present disclosure also includes embodiments that involve methods of sealing the gap between adjacent mats in a reusable load-supporting surface deployed on the ground. The load-supporting surface is capable of supporting the weight of vehicles and equipment thereupon and includes at least two mats. Each mat is planar and has at least four sides and an edge extending along each side. The first and second sides of each mat have a lower lip extending horizontally outwardly below the edge thereof. The third and fourth sides of each mat have an upper lip forming the edge thereof. The respective upper and lower lips of different mats are interconnectable with locking pins releasably securable through corresponding locking pin holes formed therein. When at least two mats are used to form the load-supporting surface, the gap is formed between adjacent edges of adjacent mats. The gap has a width, depth and length and is in fluid communication with a horizontally-extending interface formed between the adjacent upper and lower lips of adjacent mats. The interface is in fluid communication with the ground beneath the load-supporting surface.

In these embodiments, the method includes placing a first mat on the ground. An elongated closed-cell compressible sponge rubber seal member is placed along the edge of the first side of the first mat so that a first side wall of the elongated main body of the seal member abuts that edge of the first mat. The third side of the second mat is positioned adjacent to the first side of the first mat so that the edge of the third side of the second mat abuts a second side wall of the main body of the seal member, and the upper lip of the third side of the second mat overlays the lower lip of the first mat. The main body of the seal member is thus sandwiched between the respective aligned edges of the adjacent mats. At least one locking pin hole of the upper lip of the second mat is aligned over a locking pin hole of the lower lip of the first mat. A locking pin is secured in the aligned pair(s) of respective locking pin holes of the first and second mats to compress the main body of the seal member between the first and second mats and into sealing engagement with the respective adjacent edges thereof. Fluid that may be introduced onto the load-supporting surface is prevented from flowing from the gap into the interface formed between the first and second mats.

Accordingly, the present disclosure includes features and advantages which are believed to enable it to advance load-supporting surface technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein:

FIG. 1 is a top view of an exemplary load-supporting surface having seal members secured between mats in accordance with an embodiment of the present disclosure;

FIG. 2 is a perspective view of two interconnected mats of the exemplary load-supporting surface of FIG. 1;

FIG. 3 is a perspective view of an exemplary mat used in the exemplary load-supporting surface of FIG. 1;

FIG. 4 is a top view of an exemplary load-supporting surface having four interlocking mats of the type shown in FIG. 3;

DETAILED DESCRIPTION OF PREFERRED EMBODIMENTS

Figure 5:
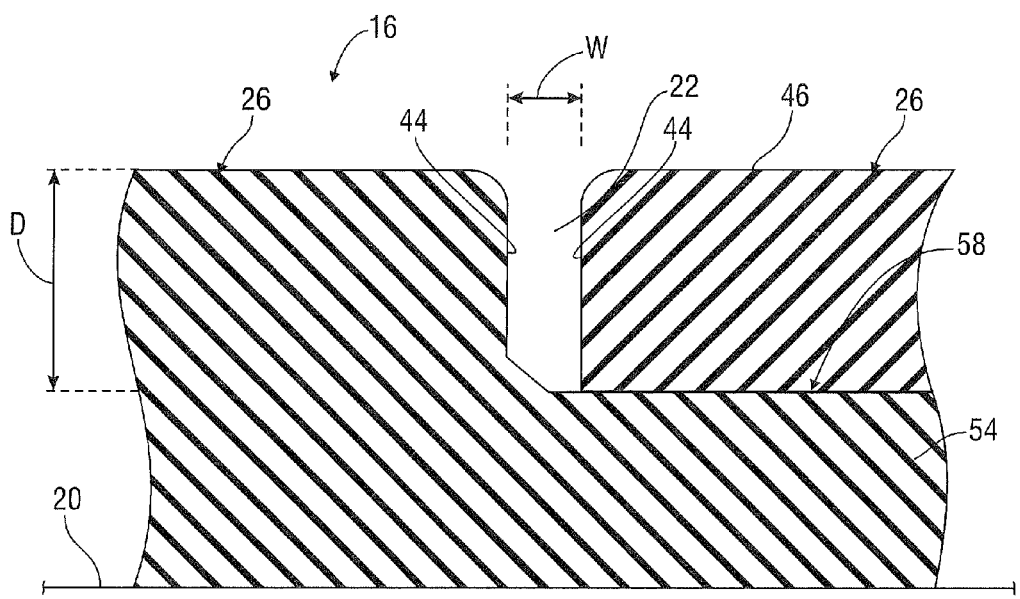
FIG. 5 is a cross-sectional view of two adjacent interlocking mats of an exemplary load-supporting surface.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms "coupled", "connected", "engaged" and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Referring initially to FIGS. 1 and 2, an exemplary seal member 10 useful for preventing the leakage of liquid through gaps 22 formed between mats 26 in a load-supporting surface 16 deployed on the ground 20 or other surface is shown. The load-supporting surface 16 is reusable and capable of supporting the weight of vehicles and equipment thereupon. The illustrated load-supporting surface 16 includes at least two interconnected mats 26.

Referring to FIG. 3, the mats 26 may have any suitable form, construction and configuration. Some examples of mats 26 which may be used in various embodiments of the present disclosure are shown and described in U.S. Pat. No. 5,653,551 to Seaux, entitled "Mat System for Construction of Roadways and Support Surfaces" and issued on Aug. 5, 1997, and U.S. Pat. No. 6,511,257 to Seaux et al., entitled "Interlocking Mat System for Construction of Load Supporting Surfaces" and issued on Jan. 28, 2003, both of which have a common Assignee as the present patent and the entire contents of which are hereby incorporated by reference herein in their entireties. For example, the mats 26 may be 14'×8' DURA-BASE® mats currently sold by the Assignee of this patent.

In the illustrated embodiment, each mat 26 is flat, or planar, and constructed of impermeable material, such as thermoplastic. The exemplary mat 26 has a rectangular shape with an opposing pair of short sides 28, 30, an opposing pair of long sides 37, 38, and an edge 44 extending along each side 28, 30, 37 and 38. In this particular example, the first short side 28 and first long side 37 each have an upper lip 46 extending horizontally outwardly therefrom, forming the edge 44 and which will be spaced above the ground 20 or other surface. The second short side 30 and second long side 38 each have a lower lip 54 extending horizontally outwardly therefrom below the edge 44 thereof and which will rest on the ground 20 or other surface. The upper and lower lips 46, 54 may have any suitable size, shape, configuration and length. It should be understood, however, that the seal member 10 of the present disclosure is not limited to use with load-supporting surfaces 16 with mats 26 having upper and lower lips 46, 54. Other embodiments may be used in connection with mat 26 not having upper and/or lower lips 46, 54.

The respective upper and lower lips 46, 54 of different mats 26 are interconnectable with locking pins 34 (e.g. FIG. 1) releasably securable through corresponding locking pin holes 32 formed therein. The locking pin holes 32 and locking pins 34 may have any suitable form, construction and configuration. In this embodiment, the illustrated mats 26 include a plurality of locking pin holes 32, each configured to accept a releasable locking pin 34 (FIG. 1) therethrough. Each illustrated mat 26 may include a total of sixteen locking pin holes 32, eight formed in each of the upper and lower lips 46, 54. In some embodiments, the locking pins 34 may form a fluid-tight seal around, or in, the locking pin holes 32 within which they are engaged. Some examples of locking pins 34 which may be used in various embodiments of the present disclosure are shown and described in U.S. Pat. No. 6,722,831 to Rogers et al, entitled "Fastening Device" and issued on Apr. 20, 2004, U.S. Provisional Patent Application Ser. No. 61/748,818, entitled "Apparatus and Methods for Connecting Mats" and filed on Jan. 14, 2013, and U.S. patent application Ser. No. 13/780,350, entitled "Apparatus and Methods for Connecting Mats" and filed on Feb. 28, 2013, all of which have a common Assignee as the present patent and the entire contents of which are hereby incorporated by reference herein in their entireties.

In the illustrated example, the locking pin holes 32 of the mats 26 have an oval-shape to accept an oval-shaped enlarged head 36 (e.g. FIG. 1) of the illustrated locking pins 34. It should be noted, however, that the present disclosure is not limited to use with the above-described or referenced types and configurations of load-supporting surfaces 16, mats 26, locking pins 34 and locking pin holes 32, or to the disclosures of the above-referenced patents and patent applications. Any suitable load-supporting surfaces 16, mats 26, locking pins 34 and locking pin holes 32 may be used.

Now referring to FIGS. 4 and 5, the gaps 22 are formed between adjacent edges 44 of adjacent interconnected mats 26 in the load-supporting surface 16. Each illustrated gap 2244 has a width W, depth D and length $L_1$ or $L_2$ and is in fluid communication with a horizontally-extending interface 58 formed between the adjacent upper and lower lips 46, 54 of the adjacent mats 26. The interface 58 is in fluid communication with the ground 20 beneath the load-supporting surface 16. Thus, liquid that enters the gap 22 may seep or flow into the interface 58 between the mats 26 and then onto the ground 20 (or other surface) below the load-supporting surface 16.

Figure 6:
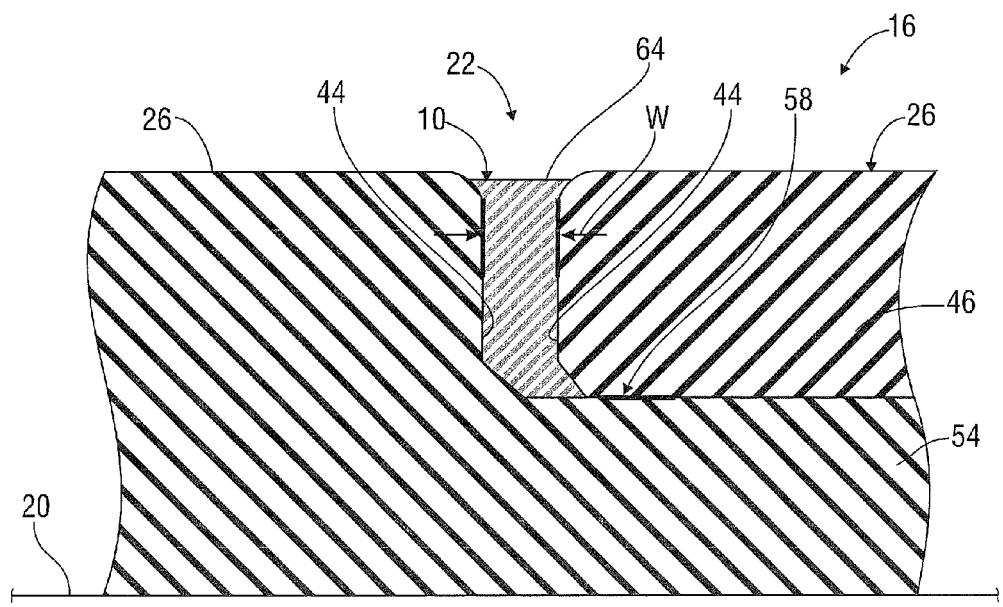
FIG. 6 is a cross-sectional view of an exemplary load-supporting surface having a seal member disposed in a gap formed between two adjacent interlocking mats in accordance with an embodiment of the present disclosure.

Now in accordance with an embodiment of the present disclosure, referring to FIG. 6, the elongated seal member 10 provides a fluid-tight seal in the gap 22 between adjacent mats 26 to prevent liquid introduced onto the load-supporting surface 16 from filling the gap 22, or flowing from the gap 22 into the interface 58 formed between the adjacent mats 26. The seal member 10 may have any suitable form, configuration and operation. Likewise, the seal member 10 may be constructed of any suitable material that is impermeable to fluid flow and can provide a liquid seal in the gap 22 to prevent liquid introduced onto the load-supporting surface 16 from filling the gap 22 or flowing from the gap 22 into the interface 58.

In some embodiments, such as shown in FIGS. 7, 8 and 9A-D, the seal member 10 is constructed of rubber, such as neoprene, and formed in an extrusion process. For another example, the seal member 10 may formed by casting. The illustrated seal member 10 includes an elongated main body 64 and an elongated planar tail 68. The exemplary main body 64 is configured to be positioned within the gap 22 (e.g. FIG. 2), while the illustrated tail 68 is configured to be positioned within the interface 58. The main body 64 and tail 68 may have any suitable form, configuration and operation.

Figure 7:
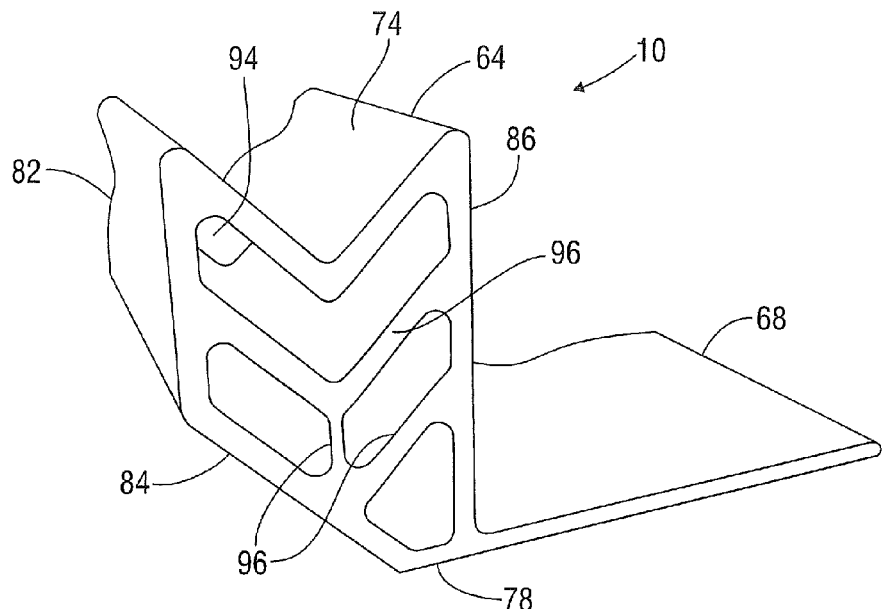
FIG. 7 is a perspective view of an embodiment of a seal member in accordance with the present disclosure.
Figure 8:
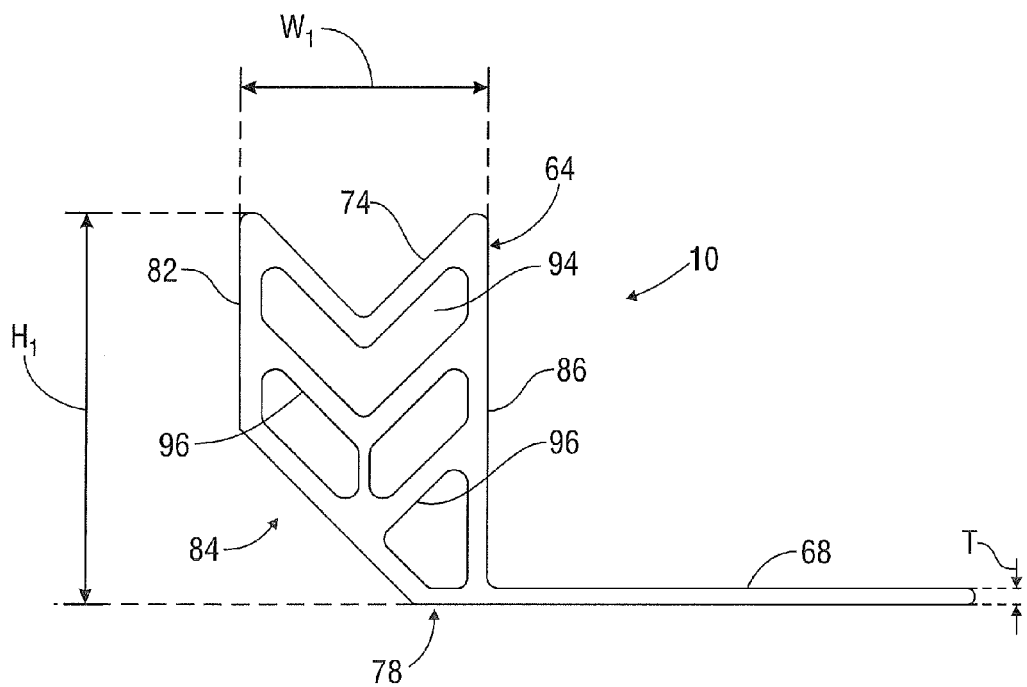
FIG. 8 is a front view of the seal member of FIG. 7.

Referring to FIGS. 7 and 8, the illustrated tail 68 extends horizontally outwardly from the main body 56 along the length of the main body 56 from a second side wall 86 of the main body 56. In some applications, the tail 68 is useful in anchoring the seal member 10 in its desired position and orientation between the adjacent mats 26 and/or maintaining the desired position of the seal member 10 during movement of the mats 26 or the load-supporting surface 16. The tail 68 may extend out any desired distance. For example, the tail 68 of some embodiments may extend outwardly from the main body 56 between approximately 0.75" and 2.50" therefrom. Likewise, the tail 68 may have any desired thickness (height). For example, the tail 68 may have a thickness of between approximately 0.05" and 0.08". The illustrated tail 68 has a thickness that is smaller than the thickness (height) of the main body 56. Accordingly, when the main body 64 is positioned in the gap 22 (e.g. FIG. 2), the exemplary tail 68 will extend into at least a portion of the interface 58 formed between the adjacent mats 26.

If desired, the main body 64 and tail 68 of the seal member 10 may be formed with a length that matches the length of the gap 22 within which it will be positioned. In the exemplary embodiment, there are two sizes of seal members 10, one for use in gaps 22 between the short sides 28, 30 (FIG. 4) of adjacent mats 26 and another used in gaps between the long sides 37, 38 of adjacent mats 26. Thus, the main body 64 and tail 68 of the exemplary "short side" seal member 10 have a length that matches the length $L_2$ of the gap 22 formed at the short sides 28, 30 (FIG. 4) of adjacent mats 26. For example, in some embodiments, the length $L_2$ of the gap 22 formed at the short sides 28, 30, and the length of the short side seal member 10, may be approximately 7 feet. The main body 64 and tail 68 of the exemplary "long side" seal member 10 have a length that matches the length $L_1$ of the gap 22 formed at the long sides 37, 38 of adjacent mats 26. For example, in some embodiments, the length $L_1$ of the gap 22 formed at the long sides 37, 38 of two adjacent mats 26, and the length of the long side seal member 10, may be approximately 28 feet. However, the seal member 10 may have differing lengths in other embodiments.

Referring still to FIGS. 7 and 8, the illustrated main body 64 includes upper and lower surfaces 74, 78 and first and second side walls 82, 86. The side walls 82, 86 are configured to sealingly engage the adjacent edges 44 (e.g. FIG. 2) of adjacent mats 26 in the load-supporting surface 16 when the main body 64 is secured in the gap 2244, such as to prevent liquid from filling the gap 2244 and passing from the gap 2244 into the interface 58.

Figure 9A:
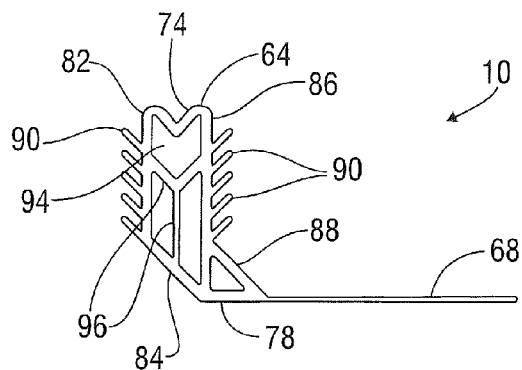
FIG. 9A is a perspective view of another embodiment of a seal member in accordance with the present disclosure.
Figure 9B:
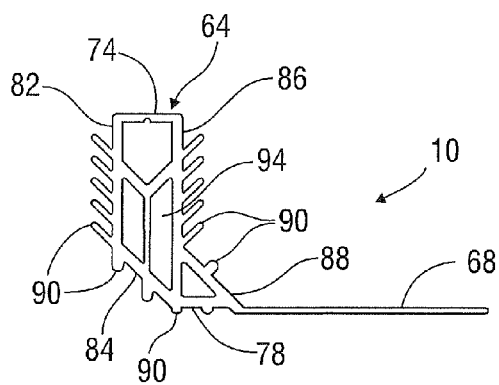
FIG. 9B is a perspective view of another embodiment of a seal member in accordance with the present disclosure.
Figure 9C:
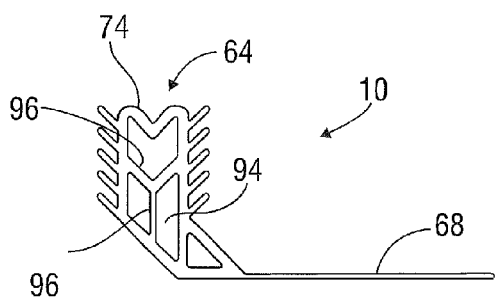
FIG. 9C is a perspective view of another embodiment of a seal member in accordance with the present disclosure.
Figure 9D:
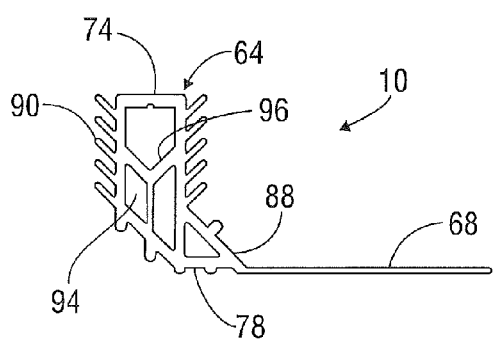
FIG. 9D is a perspective view of another embodiment of a seal member in accordance with the present disclosure.

The side walls 82, 86 may have any suitable form, configuration and operation. In this example, the side walls 82, 86 are smooth. In other embodiments, the side walls 82, 86 may not be smooth or have protrusions therefrom, such as to assist in sealingly engaging the edges 44 (e.g. FIG. 2) of the adjacent mats 26. For example, in the embodiments of FIGS. 9A-D, a plurality of fingers 90 extends laterally outwardly from each side wall 82, 86 to assist in sealingly engaging the adjacent edges 44 (FIG. 2). In FIGS. 9B and 9D, the lower surface 78 of the main body 64 also includes fingers 90.

If desired, the first and/or second side walls 82, 84 and/or the lower surface 78 of the main body 64 may be at least partially angled. This may be necessary in some applications to encourage the main body 64 to completely sealingly engage the edges 44 of adjacent mats 26 when one or both of the edges 44 has an angled portion. For example, in FIG. 2, each adjacent edge 44 of the adjacent mats 26 has an angled portion 48. As shown in FIGS. 9A-D, both the first and second side walls 82, 86 of the illustrated main bodies 64 have respective angularly oriented lower portions 84, 88 shaped to abut and engage the partially-angled edge 44 (FIG. 2) of each of the adjacent mats 26. For another example, in the embodiment of FIGS. 7 and 8, the first side wall 82 of the main body 64 has a lower portion 84 that is angled inwardly to abut and engage the partially-angled edge 44 (not shown) of an exemplary adjacent matt 26.

Referring still to FIGS. 7 and 8, the main body 64 may be formed with any suitable height $H_1$. If desired, the main body 64 may have a height $H_1$ that is smaller than the depth D (FIG. 5) of the gap 22. For example, in some embodiments, the main body 64 may have a height of $H_1$ of about 1". Also if desired, the upper surface 74 of the main body 64 may take a concave, or downwardly arching, shape when the seal member 10 is secured in place between adjacent interconnected mats 26. In some embodiments, the upper surface 74 may be pre-formed with a concave shape. In the illustrated example, the upper surface 74 is pre-formed with a V-shaped cross-section. In other embodiments, the upper surface 74 is pre-formed having a W-shaped or U-shaped cross-section, or may have another concave shape. In yet other embodiments, the upper surface 74 may be configured to bend or arch in the downward direction when the seal member 10 is secured in position between adjacent interconnected mats 26. These features may be useful in some applications to assist in preventing damage to the seal member 10 when vehicles or equipment move across the load-supporting surface 16, or for other reasons. However, in other embodiments, the upper surface 74 may be configured to arch upwardly or maintain a horizontal orientation.

Still referring to FIGS. 7 and 8, the main body 64 may be formed with any suitable width $W_1$. In some embodiments, the width $W_1$ may be greater than the width W (FIG. 5) of the gap 22. For example, the width $W_1$ may be approximately 2". In such instances, the main body 64 may be compressed when secured between adjacent interconnected mats 26. In some applications, this feature may allow the main body 64 to expand and contract within the gap 22 (e.g. FIGS. 2 and 6) and maintain sealing engagement with the adjacent edges 44 when the width W of the gap 22 varies during use of the load-supporting surface 16. For example, in some embodiments and applications, the width W of the gap 22 may change as the mats 26 expand and contract due to weather, time, the movement of vehicles, equipment, etc. over the load-supporting surface 16 or other factors.

Referring still to FIGS. 7 and 8, the illustrated body 64 may be formed with a hollow core 94 extending between the first and second sides 82, 86 and the upper and lower surfaces 74, 78 thereof. The body 64 may also include one or more support walls 96 extending across the hollow core 94, such as to provide rigidity or support for the seal member 10, resistance against crushing and collapsing of the body 64, the ability of the body 64 to compress and expand, or other purposes.

Referring back to FIGS. 1 and 2, in an exemplary method of sealing the gap 22 between adjacent mats 26 in a reusable load-supporting surface 16, a first mat 26a is placed on the ground 20. The appropriately sized seal member 10 is placed along the edge 44 of the second short side 30 of the exemplary first mat 26a, so that the first side wall 82 of the body 64 of the seal member 10 abuts that edge 44, and the tail 68 of the seal member 10 extends across a portion of the lower lip 54 of the first mat 26a. The first short side 28 of a second exemplary mat 26b is positioned adjacent to the side 30 of the first mat 26a so that the edge 44 of that side 28 of the second mat 26b abuts the second side wall 86 of the body 64 of the seal member 10, and the corresponding upper lip 46 of the second mat 26b overlays the lower lip 54 of the first mat 26a and the tail 68 of the seal member 10. Thus, the body 64 of the exemplary seal member 10 becomes sandwiched between the respective aligned edges 44 of the adjacent mats 26a, 26b and the tail 68 of the seal member 100 becomes sandwiched between the respective aligned upper and lower lips 46, 54 of the adjacent mats 26.

At least one locking pin hole 32 of the illustrated upper lip 46 (e.g. FIG. 1) of the second mat 26b is aligned over a locking pin hole (not shown) of the lower lip 54 of the first mat 26a. A locking pin 34 in secured the at least one aligned pair of respective locking pin holes 32 of the first and second illustrated mats 26a, 26b to compress the body 64 of the seal member 10 between the first and second mats 26a, 26b and into sealing engagement with the respective adjacent edges 44 thereof. Fluid that may be introduced onto the load-supporting surface 16 is thus prevented from filling the gap 22 and entering the interface 58 formed between the first and second mats 26a, 26b.

In this embodiment, the same acts as described above may be used in connection with placement of seal members 10 between all the adjacent sides side 28, 30, 37, 38 of each mat 26 used in forming the load-supporting surface 16. Moreover, the above-described acts could be performed with multiple mats 26 at the same approximate time, sequentially or otherwise when desired to form the load-supporting surface 16.

Figure 10:
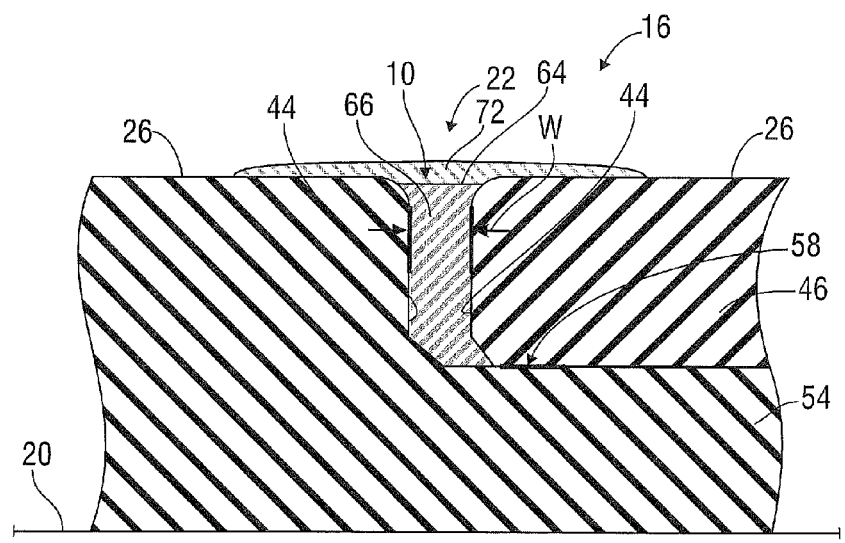
FIG. 10 is a cross-sectional view of an exemplary load-supporting surface having an exemplary seal member disposed in a gap formed between two adjacent interlocking mats and an exemplary top layer placed over the seal member and adjacent mats in accordance with an embodiment of the present disclosure.

In another embodiment, as shown in FIG. 10, the main body 64 of the seal member 10 is constructed of closed-cell compressible sponge rubber 66. In this example, the seal member 10 does not include a tail 68. However, other examples of seal members 10 with closed-cell compressible sponge rubber 66 may have a tail 68. Otherwise, this embodiment of the seal member 10 may have the same or similar features of the seal members 10 of the embodiments described above and as shown in FIG. 1, 2, 7-9D. The exemplary closed-cell compressible sponge rubber 66 is preformed in an amount sufficient to fill the volume of empty space defining the gap 22 between adjacent mats 26. The seal members 10 of this embodiment may be secured between mats 26 in a load-supporting surface 16 in the same general manner as described above or otherwise as desired.

The exemplary closed-cell compressible sponge rubber 66 may have any suitable construction, form, configuration and operation. Some examples of suitable materials used for the closed-cell compressible sponge rubber 66 are (i) polychloroprene; (ii) ethylene propylene diene monomer (M-class) rubber or EPDM; (iii) high density polyethylene; (iv) blends of styrene butadiene rubber and chloroprene; (v) blends of vinyl nitrile rubber and chloroprene; (vi) blends of styrene butadiene rubber, chloroprene and vinyl nitrile rubbers; and (vii) mixtures thereof. Such materials are compressible or slightly compressible and are capable of filling the gap 22.

In many embodiments, it may be preferred that the closed-cell compressible sponge rubber 66 resists oil contact, ozone, alkalis and acids and withstand temperatures up to 200° F. In some embodiments, the closed-cell compressible sponge rubber 66 includes closed-cell sponge rubbers or expanded rubbers having cells resembling individual balloons capable of holding gas while not allowing moisture to pass through it. Such materials may be prepared, for example, by mixing rubber compounds with a chemical blowing agent. Under the heat and pressure of a pre-cure or pre-forming process, the blowing agent decomposes and mixes with the rubber compound and generates nitrogen gas.

In many embodiments, the closed-cell compressible sponge rubber 66 is deflected 20-35% at 2-5 psi, ASTM D1056 or ASTM D6576. In some embodiments, the closed-cell compressible sponge rubber 66 is deflected approximately 0.1 inch/psi. In a particularly preferred embodiment, in light of its weatherability and resistance to oilfield fluids, the closed-cell compressible sponge rubber 66 may contain polychloroprene or neoprene, preferably 100% neoprene polymer, such as neoprene sheets presently obtainable from Acadiana Rubber & Gasket Company of Lafayette, La.

If desired, a top layer 72 of additional material may be applied onto the top of the seal member 10 and adjacent mats 26 as an added assurance of the liquid impermeability of the seal member 10, assist in filling the gap 22 or other desired purpose. After securing the seal member 10 between the adjacent mats 26, the top layer 72 is introduced. The top layer 72 may have any suitable construction, form and configuration. In some embodiments, the top layer 72 acts as an absorbent to curtail or eliminate the flow of liquids along the gap 22. For example, the top layer 72 may be a fibrous absorbent. Suitable fibrous absorbents may include any combination of "renewable" fibrous natural material, such as one or more among cotton, sisal, kapok, agave/henequen, abaca/manila hemp, palmetto, flax/linen, hemp/burlap, jute, ramie, kenaf, coir, wool, cellulose fibers or the like, as well as synthetic, man-made or non-fibrous materials. In some embodiments, kenaf may be a preferred fibrous absorbent used in the top layer 72.

If desired, a sealant (not shown) may be placed over the body 64 of adjacent seal members 10 in the corners 60 (e.g. FIG. 1) formed between adjacent mats 26, such as to assist in connecting and/or sealing the intersections of adjacent seal members 10. Any suitable sealant, such as silicone glue, may be used.

While the seal member 10 is described herein as being used in gaps 22 formed between adjacent mats 26, it may be used similarly as described above between mats 26 and other components associated with a load-supporting surface 16, or between the other components themselves. Some potential additional components that may be useful in connection with load-supporting surfaces 16, such as berm members, spacers, drive-over barriers, liquid drain assemblies, etc., are shown and disclosed in U.S. patent application Ser. No. 13/790,916, entitled "Liquid Containment System for Use With Load-Supporting Surfaces" and filed on Mar. 8, 2013, which has a common Assignee as the present patent and the entire contents of which is hereby incorporated by reference herein in its entirety.

Figure 11:
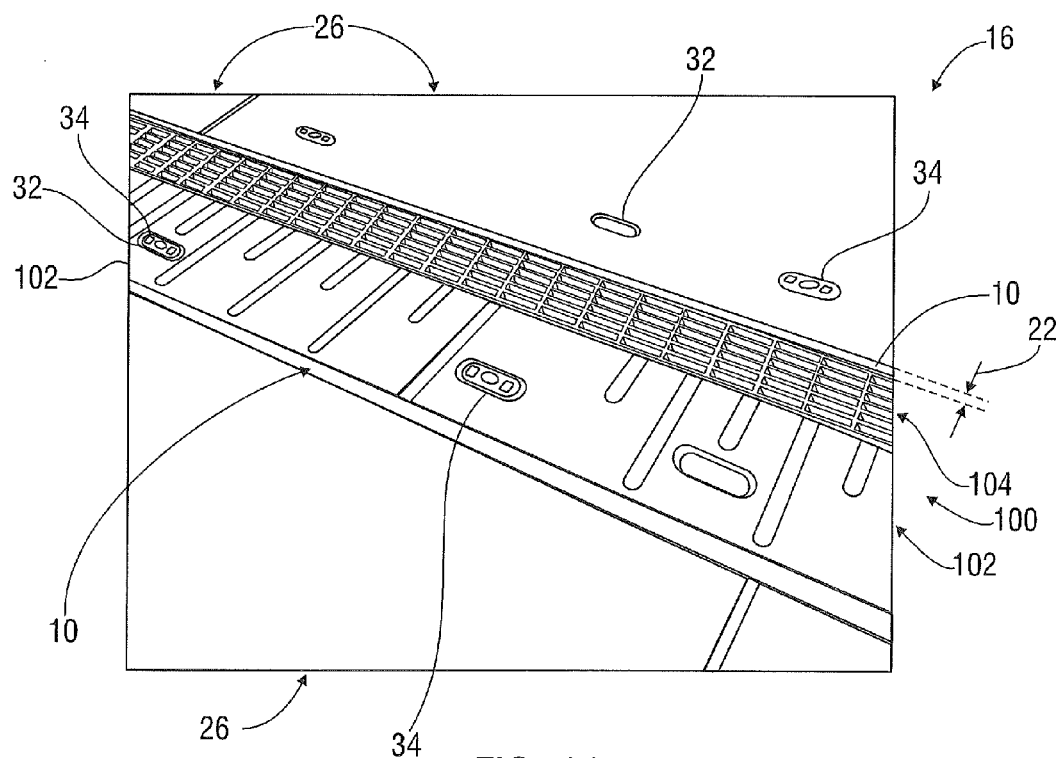
FIG. 11 is a top view of an exemplary load-supporting surface having exemplary seal members secured between a liquid drain assembly and mats in accordance with an embodiment of the present disclosure.

For example, in the embodiment of FIG. 11, seal members 10 are shown engaged in gaps 22 formed between a liquid drain assembly 100 and mats 26 of the illustrated load-supporting surface 16. The illustrated liquid drain assembly 100 includes a pair of elongated, axially-aligned drain channels 102 such as described in U.S. patent application Ser. No. 13/790,916. Each exemplary drain channel 102 includes at least one elongated fluid flow passageway (not shown) that allows controlled drainage of liquid off of the load-supporting surface 16. In this example, the passageways are covered with a load bearing cover 104 useful to allow people, vehicles (not shown) or other equipment or structures to move across the load-supporting surface 16 or be placed atop the drain channel 102 or other purpose, such as described in U.S. patent application Ser. No. 13/790,916. The illustrated drain channels 102 also include locking pin holes 32 through which locking pins 34 are engageable for connection with adjacent mats 26.

Accordingly, in many embodiments, the seal members 10 may be used in a load-supporting surface 16 to create a positive liquid impermeable seal within the gaps 22 between mats 26 and/or other components. This may be useful in certain applications to prevent liquid from filling one or more gaps 22 and flowing off the sides of the load-supporting surface 16, and/or prevent the leakage of liquid onto the ground 20 or other underlying surface from between adjacent mats 26 and/or other components, all without the need for liners (not shown) underneath the load-supporting surface 16.

If desired, the seal members 10 may be part of a spill management system to prevent liquid leakage from one or more permanent, semi-permanent or temporary load-supporting surface 16 and facilitate clean-up or disposal of such liquid. For example, the seal members 10 may be used in conjunction with technology shown and disclosed in any combination of U.S. Pat. Nos. 5,653,551 and 6,511,257, and U.S. patent application Ser. Nos. 13/780,350 and 13/790,916, such as to provide a self-contained fluid barrier system around and across the load-supporting surface 16 without the need for any liners below or adjacent to the load-supporting surface 16.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods that may be described above or claimed herein and any other methods which may fall within the scope of the appended claims can be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

The invention claimed is:

1. Apparatus for sealing the gap between adjacent mats in a reusable load-supporting surface deployed on the ground, the load-supporting surface capable of supporting the weight of vehicles and equipment thereupon and including at least two mats, each mat being planar and having at least four sides and an edge extending along each side, the first and second sides of each mat having a lower lip extending horizontally outwardly below the edge thereof and the third and fourth sides of each mat having an upper lip forming the edge thereof, wherein when an upper lip of one mat is positioned atop the lower lip of an adjacent mat, the respective upper and lower lips are interconnectable with locking pins releasably securable through corresponding locking pin holes formed therein, the gap being formed between adjacent edges of adjacent interconnected mats in the load-supporting surface, the gap having an upper end, lower end, width, depth and length and being in fluid communication with an interface formed and extending from the lower end of the gap horizontally between the respective adjacent upper and lower lips of the adjacent mats, the interface being in fluid communication with the ground beneath the load-supporting surface, the apparatus comprising:

an elongated seal member constructed of rubber and including
an elongated main body having a height, an upper end, a lower end and first and second sides and being configured to be disposed within the gap, said main body having a width that is greater than the width of the gap and first and second side walls disposed at said respective first and second sides thereof and configured to sealingly engage the respective adjacent edges of the adjacent mats that form the gap to prevent the ingress of fluid from the gap into the interface formed between the adjacent mats, and
an elongated planar tail extending outwardly from said second side of said main body proximate to said lower end of said main body, said elongated planar tail having a thickness that is smaller than said height of said main body and being configured to extend into at least a portion of the interface when said main body is disposed within the gap,
whereby fluid introduced onto the load-supporting surface is prevented from flowing from the gap into the interface formed between the adjacent mats.

2. The apparatus of claim 1 wherein said main body includes an upper surface that is concave when the adjacent mats are secured together and configured to assist in preventing damage to said seal member when vehicles or equipment move across the load-supporting surface.

3. The apparatus of claim 2 wherein said upper surface of said main body is formed with a V-shaped cross-section.

4. The apparatus of claim 2 wherein said upper surface of said main body is formed with at least one among a U-shaped cross-section and a W-shaped cross-section.

5. The apparatus of claim 2 wherein said tail is formed with a length of between about 0.75" and 2.50" and a thickness of between about 0.050" and 0.080".

6. The apparatus of claim 1 further including a plurality of fingers extending laterally outwardly from each of said first and second side walls of said main body, said fingers being configured to sealingly engage the adjacent edges of the adjacent mats that form the gap.

7. The apparatus of claim 1 wherein said main body is configured to compress and expand in the gap to maintain sealing engagement of said first and second sides thereof with the adjacent edges of the adjacent mats that form the gap as the mats contract and expand during use of the load-supporting surface.

8. The apparatus of claim 7 wherein said main body includes upper and lower surfaces and a hollow core extending between said first and second sides and said upper and lower surfaces thereof, said main body further including a plurality of support walls extending across said hollow core.

9. The apparatus of claim 8 wherein the edge of at least one among the first, second, third and fourth sides of each mat is at least partially angled, further wherein at least one among said first and second side walls and said lower surface of said main body is at least partially angled to abut an angled portion of at least one adjacent edge of the adjacent mats when said seal member is positioned in the gap between them in the load-supporting surface.

10. The apparatus of claim 1 further including a plurality of said elongated seal members, each said seal member being configured to seal the gap along at least one side of at least two adjacent mats in the load-supporting surface so that the entire load-supporting surface is sealed to prevent the leakage onto the ground of fluid through the gaps and interfaces formed between the mats of the load-supporting surface.

11. The apparatus of claim 10 wherein the mats are rectangular and the first and third sides thereof are shorter than the second and fourth sides thereof, further wherein a first said elongated seal member has a length of approximately seven feet and is positionable in the gap formed between the first and third sides of adjacent mats and a second said elongated seal member has a length of approximately twenty eight feet and is positionable in the gaps formed between the second and fourth sides of two sets of adjacent mats.

12. The apparatus of claim 1 wherein said main body of said seal member has a height that is smaller than the height of the gap to assist in preventing damage to said seal member when vehicles or equipment move across the load-supporting surface.

13. Method of sealing the gap between adjacent mats in a reusable load-supporting surface deployed on the ground with the use of an elongated seal member constructed of rubber and including an elongated main body and an elongated planar tail, the elongated main body having a height, an upper end, a lower end and first and second sides, the main body having a width that is greater than the width of the gap and first and second side walls disposed at the respective first and second sides thereof, the elongated tail extending outwardly from the second side of the main body proximate to the lower end of the main body, the elongated planar tail having a thickness that is smaller than the height of the main body, the load-supporting surface capable of supporting the weight of vehicles and equipment thereupon and including at least two mats, each mat being planar and having at least four sides and an edge extending along each side, the first and second sides of each mat having a lower lip extending horizontally outwardly below the edge thereof and the third and fourth sides of each mat having an upper lip forming the edge thereof, wherein when an upper lip of one mat is positioned atop the lower lip of an adjacent mat, the respective upper and lower lips are interconnectable with locking pins releasably securable through corresponding locking pin holes formed therein, the gap being formed between adjacent edges of adjacent mats, the gap having an upper end, lower end, width, depth and length and being in fluid communication with an interface formed and extending from the lower end of the gap horizontally between the respective adjacent upper and lower lips of the adjacent mats, the interface being in fluid communication with the ground beneath the load-supporting surface, the method comprising:

(a) placing a first mat on the ground;
(b) placing at least one elongated seal member along the edge of the first side of the first mat so that the first side wall of the elongated main body of the seal member abuts that edge of the first mat and the elongated tail of the seal member extends across a portion of the lower lip of the first mat along its first side;
(c) positioning the third side of a second mat adjacent to the first side of the first mat so that the edge of the third side of the second mat abuts the second side wall of the main body of the seal member and the upper lip of the third side of the second mat overlays the lower lip of the first mat and at least a portion of the elongated tail of the seal member, wherein the main body of the seal member is sandwiched between the respective aligned edges of the adjacent mats and the elongated tail of the seal member is sandwiched at least partially between the respective aligned upper and lower lips of the adjacent mats;
(d) aligning at least one locking pin hole of the upper lip of the second mat over a locking pin hole of the lower lip of the first mat; and
(e) securing a locking pin in the at least one aligned pair of respective locking pin holes of the first and second mats to compress the main body of the seal member in the gap formed between the first and second mats and into sealing engagement with the respective adjacent edges thereof, whereby fluid introduced onto the load-supporting surface is prevented from flowing from the gap into the interface formed between the first and second mats.

14. The method of claim 13 further including repeating steps (a)-(e) along each side of each adjacent pair of mats forming the load-supporting surface.

15. The method of claim 14 wherein corners are formed between adjacent mats in the load-supporting surface, further including placing glue over the main body of the adjacent seal members disposed in the corners.

* * * * *